C. DOERING.
MOWING MACHINE.
APPLICATION FILED JUNE 15, 1909.

1,057,948.

Patented Apr. 1, 1913.
5 SHEETS—SHEET 1.

Witnesses
J. S. Freeman.

Inventor
Charles Doering,
By Chandler & Chandler
Attorneys.

C. DOERING.
MOWING MACHINE.
APPLICATION FILED JUNE 15, 1909.

1,057,948.

Patented Apr. 1, 1913.

5 SHEETS—SHEET 3.

Witnesses

Inventor
Charles Doering,
By
Attorneys.

C. DOERING.
MOWING MACHINE.
APPLICATION FILED JUNE 15, 1909.
1,057,948.
Patented Apr. 1, 1913.
5 SHEETS—SHEET 4.
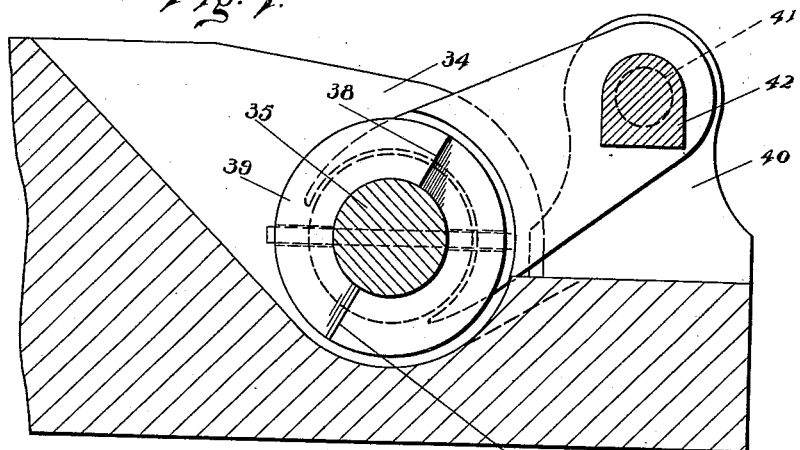
Fig. 4.
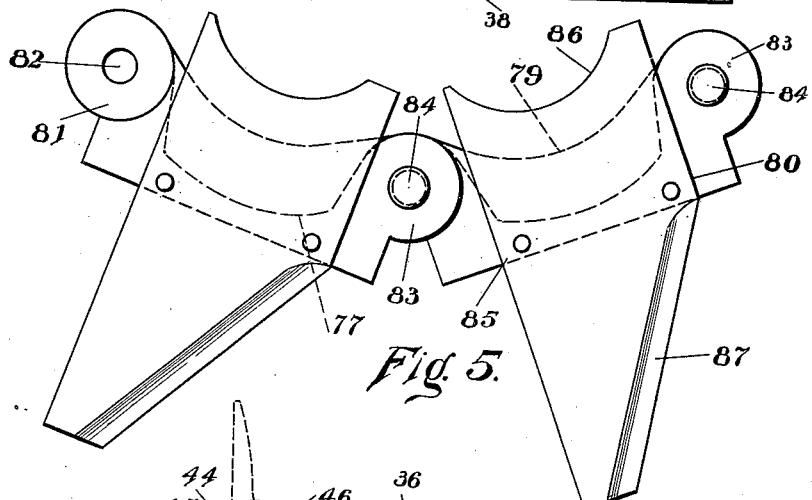
Fig. 5.
Fig. 6.
Inventor
Charles Doering,
Witnesses
J. S. Freeman.
J. W. Gillis.
By Chandler & Chandler
Attorneys.

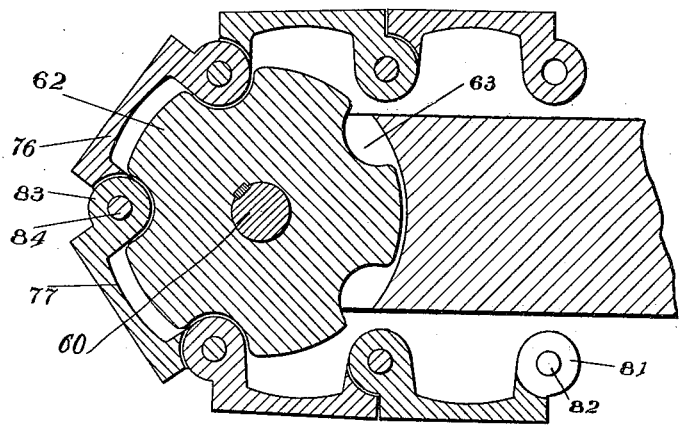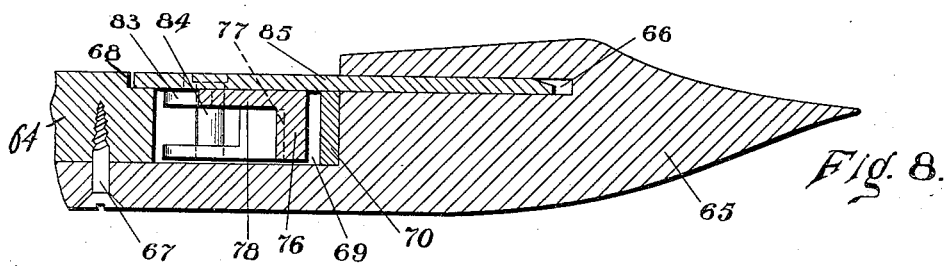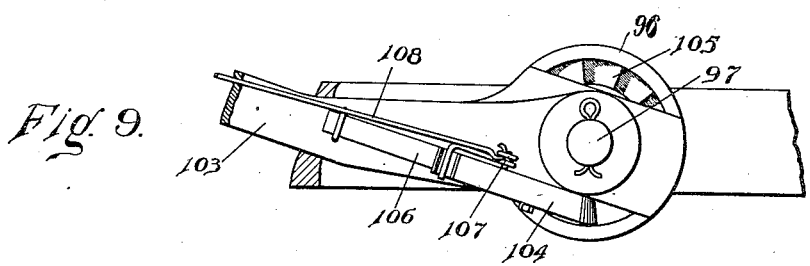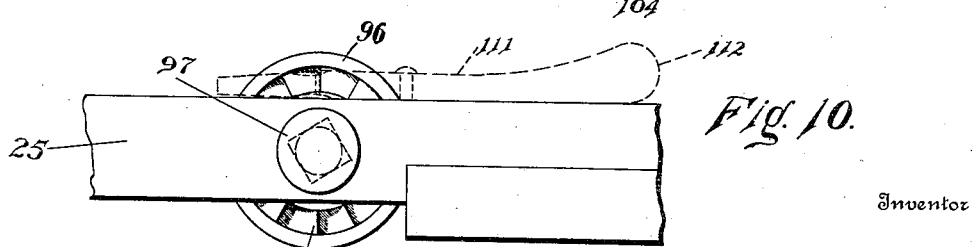

UNITED STATES PATENT OFFICE.

CHARLES DOERING, OF GLENCOE, MISSOURI.

MOWING-MACHINE.

1,057,948.  Specification of Letters Patent.  Patented Apr. 1, 1913.

Application filed June 15, 1909. Serial No. 502,277.

*To all whom it may concern:*

Be it known that I, CHARLES DOERING, a citizen of the United States, residing at Glencoe, in the county of St. Louis, State of Missouri, have invented certain new and useful Improvements in Mowing-Machines; and I do hereby declare the following to be a full, clear, and exact description of the invention, such as will enable others skilled in the art to which it appertains to make and use the same.

This invention relates to mowing machines and has special reference to a mowing machine wherein the finger bar is in the form of an endless chain.

One object of the invention is to provide an improved general construction of mowing machines of this character.

Another object of the invention is to provide an improved form of finger bar and drive therefor for use with mowing machines of this character.

A third object of the invention is to provide an improved means for raising the outer end of the finger bar.

A fourth object of the invention is to provide an improved means for tilting the finger bar.

A fifth object of the invention is to provide an improved arrangement of drive gear for the finger bar.

With the above and other objects in view, the invention consists in general of an improved form of chain cutter knife together with novel operating means therefor combined with novel means to raise the outer end of the finger bar, and improved tilting mechanism therefor.

The invention further consists in certain novel details of construction and combinations of parts hereinafter fully described, illustrated in the accompanying drawings, and specifically set forth in the claims.

Figure 1:
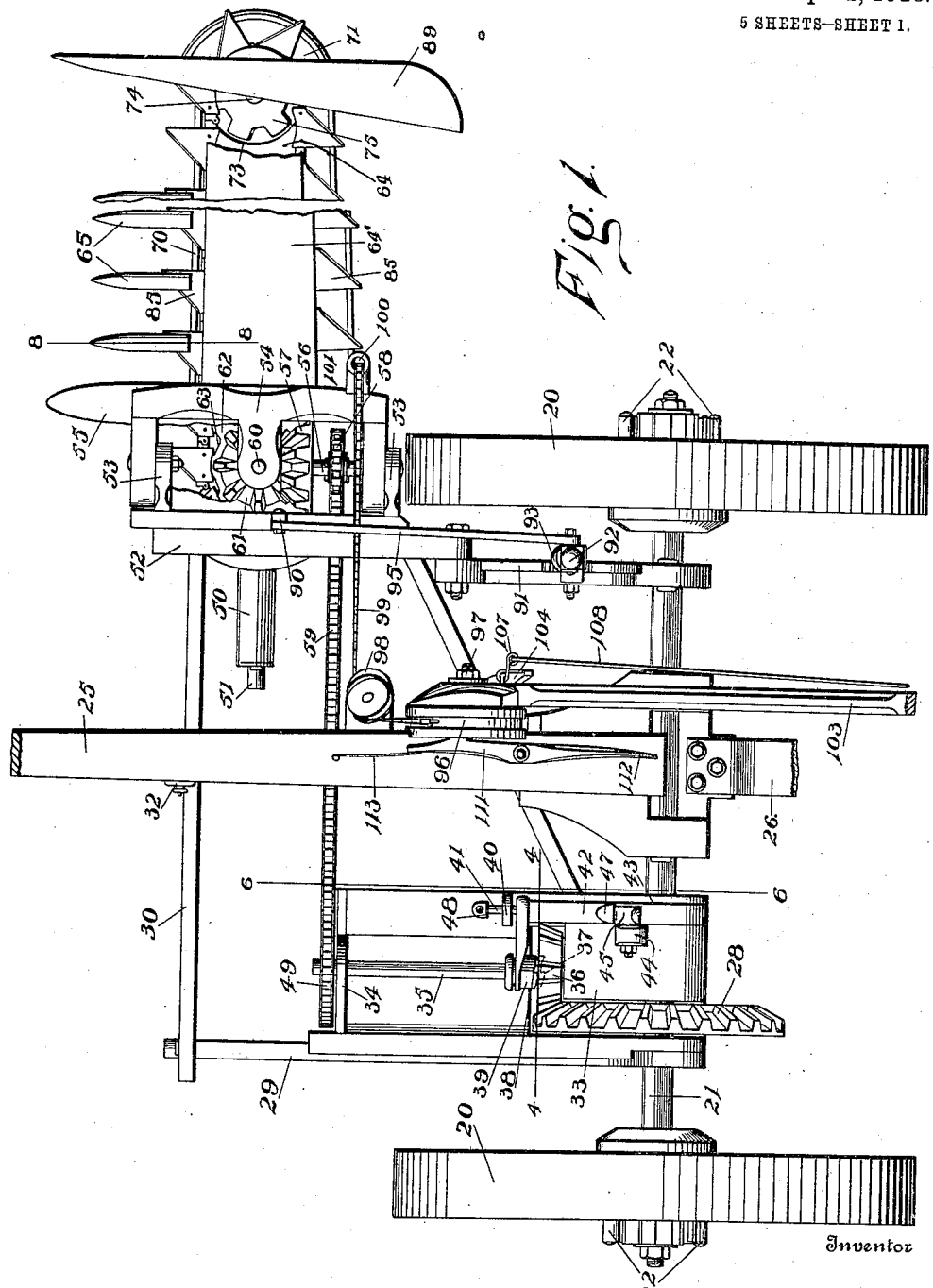
Figure 2:
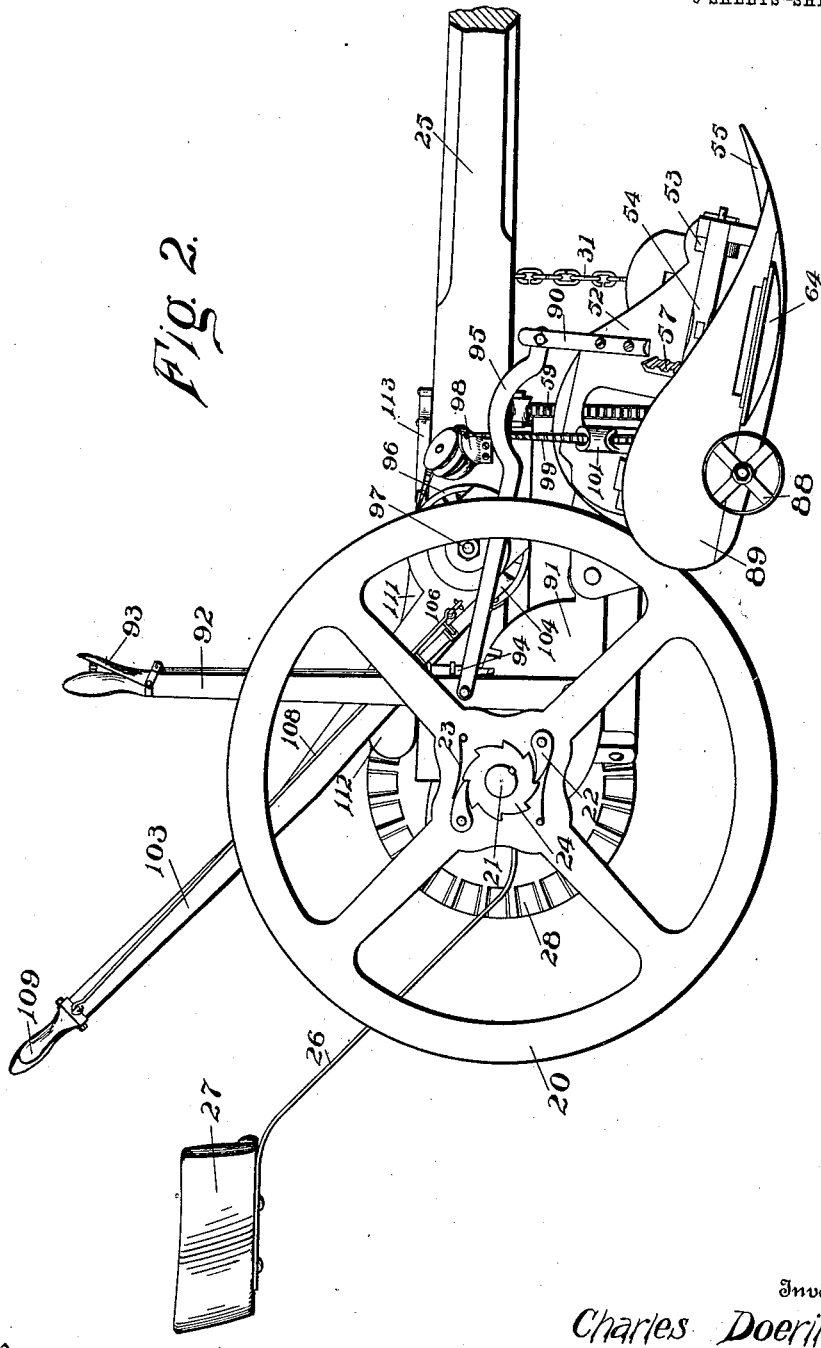
Figure 3:
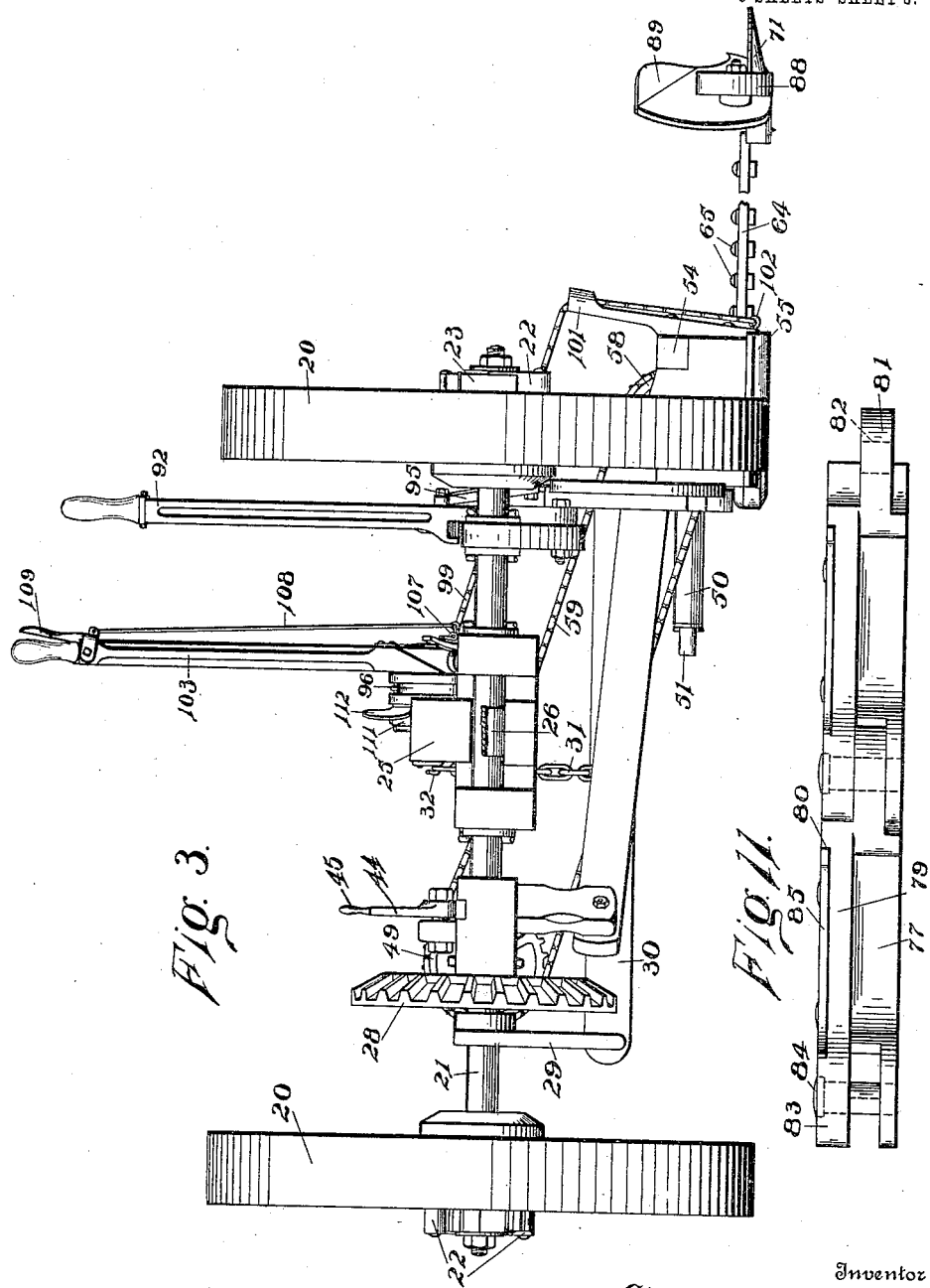

In the accompanying drawings, like characters of reference indicate like parts in the several views, and Figure 1 is a top plan view of a mowing machine constructed in accordance with this invention. Fig. 2 is a side elevation thereof. Fig. 3 is an end elevation thereof. Fig. 4 is an enlarged section on the line 4—4 of Fig. 1. Fig. 5 is an enlarged view of two of the links of the knife chain. Fig. 6 is an enlarged section on the line 6—6 of Fig. 1. Fig. 7 is an enlarged detail of one of the knife sprockets. Fig. 8 is an enlarged section through the finger bar and knife. Fig. 9 is an enlarged detail showing one side of a portion of the mechanism used in raising the outer end of the finger bar. Fig. 10 is a view showing the other side of the mechanism illustrated in Fig. 9. Fig. 11 is an enlarged view of two of the knives with the links to which they are attached, the view showing the construction of these links.

The body of the machine is supported on ground wheels 20 which are connected by an axle 21. Upon each of these ground wheels 20 there is carried a pair of oppositely disposed pawls 22 which are pivoted to the wheels and which are normally pressed toward the axle by means of springs 23 fixed upon the ground wheels. Securely keyed upon the axle at each end thereof is a ratchet 24 which is so positioned as to be engaged by the pawls 22 and these pawls and ratchets are so arranged that when the machine is drawn forward the axle 21 will be caused to rotate by the engagement of the pawls with the ratchet, while when backing the pawls will slide over the ratchet so that the axle will not be rotated. The reason of this provision is that when turning corners it sometimes happens that it is desirable that one of the wheels be rotated in a backward direction while the other continues to move forward.

Upon the axle 21 is supported a tongue 25 for the purpose of attaching draft animals and this tongue is so arranged that the axle rotates freely with reference thereto. Upon the rear end of the tongue 25 is a spring bracket 26 arranged to carry a driver's seat 27 upon the upper rear end thereof. Securely fixed upon the axle 21 is a gear 28. Supported on the axle 21 is a frame 29 which at its forward end is provided with a cross bar 30 extending beneath the tongue 25, and fixed to this cross bar is a chain 31 while upon the tongue 25 is a hook 32 with which the links of the chain are adapted to be engaged. By means of this chain and hook the angle between the frame and the tongue may be varied as desired. Mounted in bearings 33 and 34 is a shaft 35 whereon is rotatably mounted a pinion 36 meshing with the bevel gear 28. The pinion 36 is provided on its forward side with ratchet teeth 37 arranged to engage with similar ratchet teeth 38 formed on a sliding collar 39 which is splined to the shaft 35. In order to operate this sliding collar there is provided a bracket 40 through which passes a stem 41. This stem is attached to a bar 42 which is slidable in a slot 43 formed in one of the frame members. On this frame member is a bracket 44 whereto is pivoted a cam lever 45 having a flattened surface 46 which bears against a projection 47 formed on the bar 42. This cam lever 45 is so arranged that it serves to hold the bar 42 in the slot 43 and at the same time when the handle end of the cam lever is raised it forces the bar 42 forward against a spring 48 securely fixed upon the frame member behind the bracket 40. By means of this construction the shaft 35 can be locked to or freed from the pinion 36. Now, when the wheels 20 are revolved forward they turn the axle 21 and with this axle the gear 28 rotates in turn rotating the gear 36. If the clutch be thrown in this will cause the shaft 35 to rotate. Upon this shaft 35 is mounted a sprocket 49, the sprocket being securely keyed to the shaft.

Upon the frame 29 is formed a sleeve 50 and in this sleeve is a stem 51 which supports a bracket 52. This bracket 52 is provided with a pair of spaced ears 53. Pivoted to the ears 53 is a cutter bar heel frame 54 and beneath this heel frame is mounted a shoe 55. In this frame 54 are formed bearings wherein is supported a shaft 56 having a bevel gear 57 mounted thereon. Upon the shaft 56 is further fixed a sprocket 58. A sprocket chain 59 runs over the sprocket 58 and the sprocket 49 thus serving to drive the gear 57. Mounted in suitable bearings on the frame 54 is a shaft 60 whereon is mounted a bevel gear 61 which meshes with the gear 57. Keyed upon the shaft 60 is a sprocket 62 and this sprocket is of peculiar character being provided with relatively broad teeth having segmental spaces 63 between the teeth.

Securely fixed upon the frame 54 is a finger bar 64 which is housed by a cover 64' and is provided with forwardly extending fingers 65 the ends whereof are of the usual conoidal shape. These fingers are provided each with a guide slot 66 and are secured to the finger bar by means of a suitable screw 67 so that they may be detached for replacement or repair. The edge of the finger bar is formed with a rabbet 68 extending therearound and this rabbet is so arranged that the bottom thereof is flush with the bottoms of the slots 66 when the parts are assembled. Furthermore, the fingers 65 have the forward portions thereof spaced from the finger bar proper so that between each finger and the finger bar is a recess 69. Secured to the fingers at the front of this recess is a stop strip 70 for the purpose of preventing grass and the like from entering the recess from the front thereof. The outer end of the finger bar is provided with a rabbeted portion 71 and the bottom of this rabbet is level with the bottom of the recess 69. Furthermore, the inner face of this rabbet is arcuate in shape as indicated at 73. Supported on this rabbeted portion is a stub shaft 74 whereon is mounted a sprocket 75 similar in character and construction to the sprocket 62.

Around the sprockets 62 and 75 extends a chain of peculiar construction. Each of the links of this chain comprises a body portion 76 the outer face whereof is a plane surface while the inner face is arcuate as indicated at 77 and this arc is struck to the same radius as the drive sprocket 62. Projecting rearwardly from this body portion is a portion 78 which also has an arcuate rear face as can be best seen in Fig. 5 at 79. This rearwardly extending portion is provided with a transverse recess 80 and formed at one end of this rearwardly extending portion is a single ear 81 provided with a perforation 82, the ear being substantially 1/3 the depth of the body portion and located substantially in the center thereof. At the other end of the body portion are provided spaced ears 83 their outer faces being coterminous with the upper and lower faces of the body portion while the space between is sufficient to receive the ear 81. Pins 84 pass through the openings in these ears and serve to pivotally connect the links of the chain. Within each of the recesses 80 is mounted a sickle blade comprising a body portion 85 the rearward end of which is arcuate in contour as indicated at 86. One edge of this sickle blade is at right angles to the front face of its respective link while the cutting edge thereof is at a right angle thereto, this cutting edge being indicated at 87. As these chain links pass around the sprockets the joints thereof are received in the recesses between the teeth of the sprockets. The inner face of the body bears against the top of the sprocket teeth while the portion 78 overlaps the sprocket and serves to support the chain thereon at a point where it receives no support from the insides of the recesses 69 through which said chain passes. Furthermore, the arcuate rear edge of the portion 78 permits the hub of the driving gear to revolve therein without interference therewith and in like manner the arcuate rear edge of the cutter blades 85 subserve the same function. Furthermore, this rearward extension of the cutter blade is provided so that these blades may have their rear ends supported in the rabbet 68 while their forward ends pass through the slot 66 in the fingers 65.

In order to support the outer end of the finger arm when the latter is in lowered position there is rotatably mounted thereon a ground wheel 88. On the outer end of the finger arm is also mounted the usual grain or divider board 89.

In order to raise the forward ends of the fingers from the ground so that the angle of cut may be regulated, upon the frame 54 is an upwardly extending arm 90. Upon the frame 29 is a quadrant 91 and pivoted to this quadrant is a lever 92 provided with the usual latch 93 having a finger 94 to engage the notches in the quadrant. A link 95 connects the lever 92 with the arm 90. When the lever 92 is moved backward the arm 90 is also drawn backward and this causes the forward ends of the fingers to raise while if the arm 92 be pushed forward the forward ends of these fingers are depressed.

In order to lift the outer end of the finger bar and turn the finger bar to a substantially vertical position there is mounted on the tongue 25 a rotatable drum 96 which is carried on the shaft 97 fixedly attached to said tongue. Upon the tongue 25 is also mounted a guide sheave 98 and through this guide sheave passes a flexible member 99 one end of which is attached to the drum 96 while the opposite end thereof passes downward through an eye 100 formed in a bracket 101 and is attached to a bolt 102 at the lower part of the frame 54 and toward the rear end thereof. The bracket 101 is firmly attached to this frame and it is to be noted that the eye 100 is of greater diameter than the flexible element 99. If, now, the drum be rotated in the proper direction the frame 54 will be rotated on its pivot members which connect said frame to the ears 53 until the bracket 101 is in alinement with the flexible element 99. By reason of the enlarged eye the stress on the flexible element will now be brought directly on the bolt 102 so that the frame may be still further rotated. As the frame rotates the finger bar and parts attached thereto will, of course, be raised synchronously therewith.

In order to rotate the drum 96 there is provided a lever 103 which is freely revoluble on the shaft 97. Mounted on this lever is a pawl 104 and formed upon the face of the drum 96 are ratchet teeth 105 wherewith this pawl engages. The pawl is normally held in engagement with these ratchet teeth by means of a suitable spring 106. Pivoted upon the lever 103 is a rock shaft 107 one arm whereof bears against the pawl 104 while to the other arm there is attached a link 108 the other end of which is attached to a latch lever handle 109 so that when the latch lever handle is moved toward the handle of the lever 103 the rock lever 107 will be caused to rotate and free the pawl 104 from the teeth 105. In order to prevent backward rotation of the drum 96 during the forward movement of the lever 103 there is formed upon said drum opposite the ratchet teeth 105 other ratchet teeth 110 and upon the tongue 25 is pivotally mounted a locking pawl 111 provided with a treadle end 112 located convenient to the driver's foot. The locking pawl is normally held in engagement with the ratchet teeth by means of a spring 113. Now, when it is desired to rotate the drum 96 and lift the outer end of the finger bar the lever 103 is moved backward and forward. On its forward motion the drum 96 is prevented from rotating with the lever by means of the pawl 111 while owing to the construction of the pawl 104 and the ratchet teeth 105 this pawl slips freely over these ratchet teeth during the forward movement. When the handle of the lever 103 is drawn backward the pawl 104 engages with the ratchet teeth 105 and rotates the drum, thus winding the flexible element 99 thereon. This rotation of the drum is permitted by the construction of the pawl 112 and ratchet teeth 111. By repeating this operation the finger bar may be raised and dropped inward until the bracket 101 strikes the frame 29 when inward movement will cease. At the point where this bracket strikes the frame the upper side of the frame is made arcuate in contour, the center of the arc being in the axis of the shaft 51. The lever 92 may now be drawn backward thus causing the sickle bar not only to rise but also to be folded backward.

In the operation of the device the finger bar rises as has been described during the passage of the machine to the field of operation. When this has been reached the finger bar is lowered by the driver unlatching the pawl 112 and allowing the lever 93 to move forward, allowing the pawl 112 to again latch, unlatching the lever 103 and moving the same backward and allowing it to latch, and repeating the operation until the sickle bar is on the ground. The bar may then be tilted bodily to the desired position by properly positioning the lever 92. The clutch 93 is then thrown in and the machine is ready for work. As the machine is driven forward the axle 21 is caused to rotate and this in turn actuates the cutter chain in the manner previously described.

There has thus been provided a simple and efficient device of the kind described and for the purpose specified.

Having thus described the invention, what is claimed as new, is:—

1. In a mowing machine, a finger bar having an outer portion provided with rabbeted edges, a stop strip spaced from said outer portion, a knife carrying chain between the stop strip and central portion of the finger bar, and knives fixed on said chain and extending therebeyond to rest in the rabbet and on the stop strip.

2. In a mowing machine, a finger bar, a series of spaced guard fingers projecting therefrom and respectively formed with lateral slots, the forward portions of each finger being spaced from the bar to form a consequent recess below and to the rear of the plane of the slot, the upper edge of the bar being formed with a rabbet whose bottom is flush with the bottoms of the slots of the fingers, a sprocket chain disposed in said recess and operating around the bar, knives attached to the chain, the forward portions of the knives being mounted to slide through the slots of the fingers and the butt portions of said knives being arranged to slide in the rabbet of the bar, and a stop strip disposed within the recess in advance of the chain and below the knives.

In testimony whereof, I affix my signature, in presence of two witnesses.

CHARLES DOERING.

Witnesses:
 HENRY A. DOERING,
 WILLIAM SCHRADER.

Copies of this patent may be obtained for five cents each, by addressing the "Commissioner of Patents, Washington, D. C."